United States Patent
Kikuchi et al.

(10) Patent No.: US 11,312,114 B2
(45) Date of Patent: Apr. 26, 2022

(54) LAMINATE INCLUDING ETHYLENE/α-OLEFIN/NON-CONJUGATED POLYENE COPOLYMER COMPOSITION, AND ETHYLENE/α-OLEFIN/NON-CONJUGATED POLYENE COPOLYMER COMPOSITION

(71) Applicant: MITSUI CHEMICALS, INC., Tokyo (JP)

(72) Inventors: Yoshiharu Kikuchi, Sodegaura (JP); Kotaro Ichino, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 49 days.

(21) Appl. No.: 16/980,028

(22) PCT Filed: Mar. 8, 2019

(86) PCT No.: PCT/JP2019/009446
§ 371 (c)(1),
(2) Date: Sep. 11, 2020

(87) PCT Pub. No.: WO2019/176796
PCT Pub. Date: Sep. 19, 2019

(65) Prior Publication Data
US 2021/0008853 A1 Jan. 14, 2021

(30) Foreign Application Priority Data

Mar. 16, 2018 (JP) .............................. JP2018-049537
Mar. 16, 2018 (JP) .............................. JP2018-049538
Mar. 16, 2018 (JP) .............................. JP2018-049540

(51) Int. Cl.
| | | |
|---|---|---|
| B32B 27/08 | (2006.01) |
| B32B 27/20 | (2006.01) |
| B32B 27/28 | (2006.01) |
| B32B 27/30 | (2006.01) |
| B32B 27/32 | (2006.01) |

(52) U.S. Cl.
CPC .............. *B32B 27/08* (2013.01); *B32B 27/20* (2013.01); *B32B 27/28* (2013.01); *B32B 27/306* (2013.01); *B32B 27/32* (2013.01); *B32B 2250/02* (2013.01); *B32B 2250/24* (2013.01); *B32B 2307/306* (2013.01); *B32B 2307/712* (2013.01); *B32B 2323/04* (2013.01); *B32B 2331/04* (2013.01); *B32B 2355/00* (2013.01); *B32B 2597/00* (2013.01); *B32B 2605/08* (2013.01)

(58) Field of Classification Search
CPC ......... B32B 27/08; B32B 27/20; B32B 27/28; B32B 27/306; B32B 27/32; B32B 2250/02; B32B 2250/24; B32B 2307/306; B32B 2307/712; B32B 2323/04; B32B 2331/04; B32B 2355/00; B32B 2597/00; B32B 2605/08
See application file for complete search history.

(56) References Cited

U.S. PATENT DOCUMENTS

| | | |
|---|---|---|
| 6,412,520 B1 | 7/2002 | Yasumatsu et al. |
| 8,530,013 B2 | 9/2013 | Shinoda et al. |
| 10,053,585 B2 | 8/2018 | Mestan |
| 2011/0088804 A1 | 4/2011 | Shinoda et al. |
| 2015/0203693 A1 | 7/2015 | Mestan |

FOREIGN PATENT DOCUMENTS

| | | |
|---|---|---|
| EP | 0 761 753 A2 | 3/1997 |
| JP | H09-025374 A | 1/1997 |
| JP | H11-291404 A | 10/1999 |
| JP | 2000-329266 A | 11/2000 |
| JP | 2002-256121 A | 9/2002 |
| JP | 2006-272898 A | 10/2006 |
| JP | 2009-143003 A | 7/2009 |
| JP | 2009-280631 A | 12/2009 |
| JP | 2010-000787 A | 1/2010 |
| JP | 2015-529712 A | 10/2015 |

OTHER PUBLICATIONS

English machine translation of JP2009-280631. (Year: 2009).*
International Search Report dated Jun. 4, 2019 for corresponding International Patent Application No. PCT/JP2019/009446.
Polymer Manufacturing Process, Kogyo Chosakai Publishing Co., Ltd., 1971, p. 309-330.
Written Opinion dated Jun. 4, 2019 for corresponding International Patent Application No. PCT/JP2019/009446.

* cited by examiner

*Primary Examiner* — Michael C Miggins
(74) *Attorney, Agent, or Firm* — Foley & Lardner LLP

(57) ABSTRACT

The present invention has an object of providing an ethylene/α-olefin/non-conjugated polyene copolymer composition excellent in the adhesive strength with a layer of a saponified ethylene/vinyl acetate copolymer; and the present invention relates to a laminate comprising a layer of a copolymer composition comprising 100 parts by mass of an ethylene/α-olefin/non-conjugated polyene copolymer (A) and one or more additives selected from the following (1) to (3), and a layer of the saponified ethylene/vinyl acetate copolymer (B). (1) 1.7 to 20 parts by mass of dicumyl peroxide and 2 to 20 parts by mass of a metal oxide; (2) 20 to 120 parts by mass of a hydrophilic fumed silica; and (3) 5 to 50 parts by mass of an ethylene/vinyl acetate copolymer (B).

6 Claims, No Drawings

LAMINATE INCLUDING ETHYLENE/α-OLEFIN/NON-CONJUGATED POLYENE COPOLYMER COMPOSITION, AND ETHYLENE/α-OLEFIN/NON-CONJUGATED POLYENE COPOLYMER COMPOSITION

RELATED APPLICATIONS

The present application claims priority under 37 U.S.C. § 371 to International Patent Application No. PCT/JP2019/009446, filed Mar. 8, 2019, which claims priority to and the benefit of Japanese Patent Application Nos. 2018-049537, 2018-049538, and 2018-049540, all filed on Mar. 16, 2018. The contents of these applications are hereby incorporated by reference in their entireties.

TECHNICAL FIELD

The present invention relates to a laminate of a layer of an ethylene/α-olefin/non-conjugated polyene copolymer composition and a layer of a saponified ethylene/vinyl acetate copolymer between which layers adhesive strength is improved, and an ethylene/α-olefin/non-conjugated polyene copolymer composition excellent in the adhesive strength with a layer of a saponified ethylene/vinyl acetate copolymer.

BACKGROUND ART

Automobiles, industrial machines, construction machines, motorbikes, farm machines and the like are installed with various types of hoses such as radiator hoses for cooling engines, drain hoses for radiator overflow, heater hoses for indoor heating, air conditioner drain hoses, hoses for wiper water supply, roof drain hoses and protect hoses. For these hoses, there are used ethylene/propylene/diene copolymers (EPDM), which are good in ozone resistance, weather resistance and heat resistance.

For example, Patent Document 1 proposes a radiator hose using, as its outermost layer, a vulcanized rubber which has an ethylene/α-olefin/non-conjugated diene copolymer as its rubber component and has a volume electric resistivity at 30% compression of $10^5$ Ω·cm or higher.

On the other hand, since olefinic polymers such as ethylene/α-olefin/non-conjugated polyene copolymers are inferior in the permeability of volatile substances such as gasoline, there is proposed, for example, a laminated resin tubular body for a hose inner tube having a composition layer of an ethylene/propylene/diene copolymer (EPDM) and a saponified ethylene/vinyl acetate copolymer (referred to also as an ethylene/vinyl alcohol copolymer) (Patent Document 2), or a laminated hose for a fuel system made by laminating a layer of a thermoplastic elastomer with a layer of an ethylene/vinyl alcohol copolymer (Patent Document 3).

In the laminate described in Patent Document 2, however, since, an ethylene/propylene/diene copolymer, which is inferior in the gas barrier property, is blended in a saponified ethylene/vinyl acetate copolymer, which is excellent in the gas barrier property, there is such a risk that the gas barrier property of the saponified ethylene/vinyl acetate copolymer is impaired.

On the other hand, although the laminated hose for a fuel system made by laminating a layer of a thermoplastic elastomer with a layer of an ethylene/vinyl alcohol copolymer has gas barrier property, the layer of the thermoplastic elastomer, since being a nonpolar polymer, is inferior in the adhesiveness with the layer of the ethylene/vinyl alcohol copolymer.

CITATION LIST

Patent Documents

Patent Document 1: JP H9-025374 A
Patent Document 2: JP 2009-143003 A
Patent Document 3: JP 2000-329266 A

SUMMARY OF INVENTION

Technical Problem

The present inventors have variously studied with an object to provide an ethylene/α-olefin/non-conjugated polyene copolymer composition excellent in the adhesive strength with a layer of a saponified ethylene/vinyl acetate copolymer.

Solution to Problem

The present invention relates to the following [1] to [7].
[1] A laminate comprising a layer of a copolymer composition comprising 100 parts by mass of an ethylene/α-olefin/non-conjugated polyene copolymer (A) and one or more additives selected from the following (1) to (3), and a layer of a saponified ethylene/vinyl acetate copolymer (B).
(1) 1.7 to 20 parts by mass of dicumyl peroxide and 2 to 20 parts by mass of a metal oxide
(2) 20 to 120 parts by mass of a hydrophilic fumed silica
(3) 5 to 50 parts by mass of an ethylene/vinyl acetate copolymer (C)
[2] The laminate according to item [1], comprising a layer of a copolymer composition comprising 100 parts by mass of the ethylene/α-olefin/non-conjugated polyene copolymer (A), and 1.7 to 20 parts by mass of dicumyl peroxide and 2 to 20 parts by mass of the metal oxide, and a layer of the saponified ethylene/vinyl acetate copolymer (B).
[3] The laminate according to item [2], wherein the metal oxide is zinc oxide or magnesium oxide.
[4] The laminate according to item [1], comprising a layer of a copolymer composition comprising 100 parts by mass of the ethylene/α-olefin/non-conjugated polyene copolymer (A) and 20 to 120 parts by mass of the hydrophilic fumed silica, and a layer of the saponified ethylene/vinyl acetate copolymer (B).
[5] The laminate according to item [4], wherein the copolymer composition forming the layer of the copolymer composition cited in item [4] further comprises 1.7 to 20 parts by mass of dicumyl peroxide.
[6] A copolymer composition, comprising 100 parts by mass of an ethylene/α-olefin/non-conjugated polyene copolymer (A), and 5 to 50 parts by mass of an ethylene/vinyl acetate copolymer (C).
[7] The laminate according to item [1], comprising a layer comprising 100 parts by mass of the ethylene/α-olefin/non-conjugated polyene copolymer (A) and 5 to 50 parts by mass of the ethylene/vinyl acetate copolymer (C), and a layer comprising the saponified ethylene/vinyl acetate copolymer (B).

Advantageous Effects of Invention

The laminate of the present invention can suitably be used for hoses and the like, since a layer of a saponified ethylene/ vinyl acetate copolymer (B) excellent in the gas barrier property firmly adheres with a layer of a copolymer composition containing an ethylene/α-olefin/non-conjugated polyene copolymer (A) good in the ozone resistance, the weather resistance and the heat resistance.

Further the copolymer composition containing the ethylene/α-olefin/non-conjugated polyene copolymer (A) of the present invention is excellent in the adhesive strength with a layer of the saponified ethylene/vinyl acetate copolymer (B).

DESCRIPTION OF EMBODIMENTS

Hereinafter, embodiments to carry out the present invention will be described.

«Ethylene/α-olefin/non-conjugated polyene copolymer (A)»

An ethylene/α-olefin/non-conjugated polyene copolymer (A) (hereinafter, abbreviated to "copolymer (A)" in some cases) constituting an ethylene/α-olefin/non-conjugated polyene copolymer composition (hereinafter, abbreviated to "copolymer composition" in some cases) for forming the laminate of the present invention is an ethylene/α-olefin/non-conjugated polyene copolymer made by randomly copolymerizing ethylene with an α-olefin having 3 to 20 carbon atoms and a non-conjugated polyene.

The above α-olefin is usually an α-olefin having 3 to 20 carbon atoms; among these, preferable are α-olefins having 3 to 10 carbon atoms, such as propylene, 1-butene, 4-methyl-1-pentene, 1-hexene and 1-octene, and propylene and 1-butene are especially preferably used.

As specific examples of the ethylene/α-olefin/non-conjugated polyene copolymer (A) according to the present invention, preferably used are ethylene/propylene/non-conjugated polyene copolymers, and ethylene/1-butene/non-conjugated polyene copolymers.

The ethylene/α-olefin/non-conjugated polyene copolymer (A) according to the present invention is desirably one in which the molar ratio (ethylene/α-olefin) of ethylene to α-olefin is usually in the range of 40/60 to 90/10, preferably 50/50 to 80/20 and especially preferably 55/45 to 70/30.

As the above non-conjugated polyene, cyclic or chain non-conjugated polyenes are used. Examples of the cyclic non-conjugated polyenes include 5-ethylidene-2-norbornene, dicyclopentadiene, 5-vinyl-2-norbornene, norbornadiene and methyltetrahydroindene. Examples of the chain non-conjugated polyenes include 1,4-hexadiene, 7-methyl-1,6-octadiene, 8-methyl-4-ethylidene-1,7-nonadiene and 4-ethylidene-1,7-undecadiene. These non-conjugated polyenes are used singly or as a mixture of two or more, and it is desirable that the content in the copolymer is, in terms of iodine value, 1 to 40, preferably 2 to 35 and more preferably 3 to 30.

In the ethylene/α-olefin/non-conjugated polyene copolymer (A) according to the present invention, the intrinsic viscosity [η] as measured in decahydronaphthalene at 135° C. is usually 0.8 to 4 dl/g, preferably 1 to 3.5 dl/g and more preferably 1.1 to 3 dl/g.

The ethylene/α-olefin/non-conjugated polyene copolymer (A) according to the present invention may be a modified substance thereof made by being graft copolymerized with an unsaturated carboxylic acid or a derivative thereof, for example, an acid anhydride.

The ethylene/α-olefin/non-conjugated polyene copolymer (A) according to the present invention is most preferably an ethylene/propylene/non-conjugated diene copolymer.

The ethylene/α-olefin/non-conjugated polyene copolymer (A) according to the present invention can be used singly or in a combination of two or more. The ethylene/α-olefin/non-conjugated polyene copolymer (A) having the above-mentioned properties can be prepared by a known method described in "Polymer Seizo Process" (Polymer Production Process) (published by Kogyo Chosakai Publishing, Ltd., pp. 309-330), or the like.

«Metal Oxide»

A metal oxide to be contained in the copolymer composition according to the present invention is preferably zinc oxide or magnesium oxide, and may be a metal oxide having been surface treated.

«Dicumyl Peroxide»

Dicumyl peroxide to be contained in the copolymer composition according to the present invention is a kind of organic peroxides used as a crosslinking agent for polymers.

«Hydrophilic Fumed Silica»

A hydrophilic fumed silica to be compounded with the copolymer (A) according to the present invention is a kind of dry silicas, and is a silica having hydrophilicity such as siloxane and silanol groups on its surface. Such hydrophilic fumed silicas are produced and sold, for example, by Nippon Aerosil Co., Ltd., in trade names of AEROSIL fumed silica, such as AEROSIL 900, AEROSIL 130, AEROSIL 150, AEROSIL 200, AEROSIL 255, AEROSIL 300, AEROSIL 380 and AEROSIL OX50.

«Ethylene/Vinyl Acetate Copolymer (C)»

An ethylene/vinyl acetate copolymer (C) according to the present invention is a copolymer of ethylene with vinyl acetate, wherein the content of vinyl acetate present in the copolymer is usually in the range of 5 to 50 parts by weight and preferably 5 to 40 parts by weight. When the content of vinyl acetate is in this range, compounding the ethylene/vinyl acetate copolymer (C) with the above copolymer (A) can provide the laminate excellent in the adhesive strength with a layer of the saponified ethylene/vinyl acetate copolymer (B).

The melt flow rate (MFR) of the ethylene/vinyl acetate copolymer (C) according to the present invention is, as a value measured according to JIS K7210 [190° C., a load of 2.16 g], usually in the range of 1.6 to 6.4 g/10 min and preferably 1.6 to 4.0 g/10 min.

<Ethylene/α-Olefin/Non-Conjugated Polyene Copolymer Composition>

An ethylene/α-olefin/non-conjugated polyene copolymer composition according to the present invention is a copolymer composition comprising 100 parts by mass of the ethylene/α-olefin/non-conjugated polyene copolymer (A) and one or more additives selected from (1) to (3).

(1) 1.7 to 20 parts by mass of dicumyl peroxide and 2 to 20 parts by mass of a metal oxide
(2) 20 to 120 parts by mass of a hydrophilic fumed silica
(3) 5 to 50 parts by mass of an ethylene/vinyl acetate copolymer (C)

Here, among the above copolymer compositions containing 100 parts by mass of the ethylene/α-olefin/non-conjugated polyene copolymer (A), a copolymer composition containing the (1) is referred to as copolymer composition (1); a copolymer composition containing the (2) is referred to as copolymer composition (2); a copolymer composition containing the (3) is referred to as copolymer composition (3); and the copolymer compositions (1), (2) and (3) may be collectively referred to as copolymer composition.

<Copolymer Composition (1)>

When the ethylene/α-olefin/non-conjugated polyene copolymer composition for forming the laminate of the present invention is the composition (1) comprising 1.7 to 20 parts by mass of the above dicumyl peroxide and 2 to 20 parts by mass of the above metal oxide, the composition contains, with respect to 100 parts by mass of the copolymer (A), 1.7 to 20 parts by mass, preferably 3.4 to 10.2 parts by mass of the above dicumyl peroxide and 2 to 20 parts by mass, preferably 2 to 15 parts by mass of the above metal oxide.

Since the copolymer composition (1) according to the present invention comprises dicumyl peroxide and the metal oxide in the above respective ranges, there can be obtained the laminate excellent in the adhesive strength between a layer of the copolymer composition (1) and a layer of the saponified ethylene/vinyl acetate copolymer (B).

The copolymer composition (1) according to the present invention, in addition to the above dicumyl peroxide and metal oxide, may contain other components according to desired purposes, in such a range not to impair advantageous effects of the present invention. As the other components, there may be contained at least one selected from fillers, crosslinking aids, vulcanization accelerators, vulcanization aids, softeners, antioxidants, processing aids, activators, heat-resistant stabilizers, weathering stabilizers, antistatic agents, colorants, lubricants, thickeners, foaming agents and foaming aids. Each of these additives may be used singly in one kind or concurrently used in two or more.

<Filler>

The filler constituting the copolymer composition (1) according to the present invention is a known rubber reinforcing agent contained in rubber compositions, and usually carbon black or an inorganic substance referred to as an inorganic reinforcing agent.

The filler according to the present invention specifically includes Asahi #55G and Asahi #60G (the forgoing, manufactured by Asahi Carbon Co., Ltd.) and carbon blacks (manufactured by Tokai Carbon Co., Ltd.) such as Seast (SRF, GPF, FEF, MAF, HAF, ISAF, SAF, FT, MT and the like), fillers that are formed by surface-treating these carbons blacks with a silane coupling agent or the like, silica, activated calcium carbonate, fine powder talc, fine powder silicic acid, light precipitated calcium carbonate, heavy calcium carbonate, talc and clay.

These fillers may be used singly or as a mixture of two or more.

As the filler according to the present invention, preferably used are carbon black, light precipitated calcium carbonate, heavy calcium carbonate, talc, clay and the like.

When the copolymer composition (1) according to the present invention contains the filler, the filler may be contained, with respect to 100 parts by mass of the above copolymer (A), usually in the range of 100 to 300 parts by mass, preferably 100 to 250 parts by mass.

<Crosslinking Aid and Vulcanization Accelerator>

Examples of the crosslinking aid include sulfur; quinone dioxime crosslinking aids such as p-quinone dioxime; acrylic crosslinking aids such as ethylene glycol dimethacrylate and trimethylolpropane trimethacrylate; ally-based crosslinking aids such as diallyl phthalate and triallyl isocyanurate; maleimide crosslinking aids; and divinylbenzene.

Examples of the vulcanization accelerator include thiazole vulcanization accelerators such as N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (for example, Sanceler M (trade name, manufactured by Sanshin Chemical Industry Co., Ltd.)), 2-(4-morpholinodithio)benzothiazole (for example, Nocceler MDB-P (trade name, manufactured by Ouchi Shinko Chemical Industrial Co., Ltd.)), 2-(2,4-dinitrophenyl)mercaptobenzothiazole, 2-(2,6-diethyl-4-morpholinothio)benzothiazole and dibenzothiazyl disulfide (for example, Sanceler DM (trade name, manufactured by Sanshin Chemical Industry Co., Ltd.)); guanidine vulcanization accelerators such as diphenylguanidine, triphenylguanidine and diorthotolylguanidine; aldehyde amine vulcanization accelerators such as acetaldehyde-aniline condensates and butyraldehyde-aniline condensates; imidazoline vulcanization accelerators such as 2-mercaptoimidazoline; thiuram vulcanization accelerators such as tetramethylthiuram monosulfide (for example, Sanceler TS (trade name, manufactured by Sanshin Chemical Industry Co., Ltd.)), tetramethylthiuram disulfide (for example, Sanceler TT (trade name, manufactured by Sanshin Chemical Industry Co., Ltd.)), tetraethylthiuram disulfide (for example, Sanceler TET (trade name, manufactured by Sanshin Chemical Industry Co., Ltd.)), tetrabutylthiuram disulfide (for example, Sanceler TBT (trade name, manufactured by Sanshin Chemical Industry Co., Ltd.)) and dipentamethylenethivam tetrasulfide (for example, Sanceler TRA (trade name, manufactured by Sanshin Chemical Industry Co., Ltd.)); dithioate salt vulcanization accelerators such as zinc dimethyldithiocarbamate, zinc diethyldithiocarbamate, zinc dibutyldithiocarbamate (for example, Sanceler PZ, Sanceler BZ and Sanceler EZ (trade names, manufactured by Sanshin Chemical Industry Co., Ltd.)) and tellurium diethyldithiocarbamate; thiourea vulcanization accelerators such as ethylenethiourea (for example, Sanceler BUR, Sanceler 22-C (trade names, manufactured by Sanshin Chemical Industry Co., Ltd.)), N,N'-diethylthiourea and N,N'-dibutylthiourea; and xanthate vulcanization accelerators such as zinc dibutylxanthate.

When the vulcanization accelerator is used, the content of the vulcanization accelerator in the copolymer composition (1) is, with respect to 100 parts by mass of the copolymer (A), usually 0.1 to 20 parts by mass, preferably 0.2 to 15 parts by mass and more preferably 0.5 to 10 parts by mass. In the above range of the content of the vulcanization accelerator, no blooming occurs on the surface of shaped products to be obtained and the copolymer composition exhibits excellent crosslinking properties. When a sulfur-based compound is used as the crosslinking agent, the vulcanization aid can be used concurrently.

<Softener>

Examples of the softener include petroleum softeners such as process oil, lubricating oil, paraffin oil, liquid paraffin, petroleum asphalt and vaseline; coal tar softeners such as coal tar; fatty oil softeners such as castor oil, linseed oil, rapeseed oil, soybean oil and coconut oil; waxes such as beeswax and carnauba wax; naphthenic acid, pine oil, and rosin and derivatives thereof; synthetic polymeric substances such as terpene resins, petroleum resins and cumarone indene resins; ester softeners such as dioctyl phthalate and dioctyl adipate; and besides, microcrystalline wax, liquid polybutadiene, modified liquid polybutadiene, hydrocarbon synthetic lubricating oil, tall oil and rubber substitutes (factices); and among these, petroleum softeners are preferable, and process oil is especially preferable.

When the copolymer composition (1) according to the present invention contains the softener, the content of the softener is, with respect to 100 parts by mass of the copolymer (A), usually 2 to 100 parts by mass and preferably 10 to 100 parts by mass.

<Antioxidant (Stabilizer)>

By inclusion of the antioxidant (stabilizer) in the copolymer composition according to the present invention, the life of seal packings formed therefrom can be extended. Such an antioxidant includes conventionally known antioxidants, for example, amine antioxidants, phenolic antioxidants and sulfur-based antioxidants.

Examples of the antioxidant include aromatic secondary amine antioxidants such as phenylbutylamine and N,N-di-2-naphthyl-p-phenylenediamine; phenolic antioxidants such as dibutylhydroxytoluene and tetrakis[methylene(3,5-di-t-butyl-4-hydroxy)hydro-cinnamate]methane; thioether antioxidants such as bis[2-methyl-4-(3-n-alkylthio propionyloxy)-5-t-butylphenyl] sulfide, dithiocarbamate salt antioxidants such as nickel dibutyldithiocarbamate; and sulfur-based antioxidants such as 2-mercaptobenzoylimidazole, 2-mercaptobenzimidazole, a zinc salt of 2-mercaptobenzimidazole, dilauryl thiodipropionate and distearyl thiodipropionate.

When the copolymer composition (1) according to the present invention contains the antioxidant, the content of the antioxidant is, with respect to 100 parts by mass of the copolymer (A), usually 0.3 to 10 parts by mass and preferably 0.5 to 7.0 parts by mass. In the above range of the content of the antioxidant, no blooming occurs from the layer of the copolymer composition of the laminate to be obtained, and occurrence of the vulcanization inhibition can also be suppressed.

<Processing Aid>

As the processing aid, a broad range of processing aids usually contained in rubbers can be used. The processing aid specifically includes ricinolic acid, stearic acid, palmitic acid, lauric acid, barium stearate, zinc stearate, calcium stearate, zinc laurate, and esters thereof. Among these, stearic acid is preferable.

When the copolymer composition (1) according to the present invention contains the processing aid, the processing aid can be suitably contained usually in an amount of 1 to 3 parts by mass with respect to 100 parts by mass of the copolymer (A). The above range of the content of the processing aid is suitable because of being excellent in processability including kneadability, extrudability and injection moldability.

The above processing aids may be used singly in one kind thereof or in two or more kinds thereof.

<Activator>

Examples of the activator include amines such as di-n-butylamine, dicyclohexylamine and monoethanolamine; diethylene glycol, polyethylene glycol, lecithin, triallyl trimellitate and zinc compounds of aliphatic carboxylic acids or aromatic carboxylic acids; zinc peroxide preparations; and octadecyltrimethylammonium bromide, synthetic hydrotalcite, and special quaternary ammonium compounds.

<Copolymer Composition (2)>

The ethylene/α-olefin/non-conjugated polyene copolymer composition (2) for forming the laminate of the present invention is a copolymer composition comprising the above hydrophilic fumed silica of 20 to 120 parts by mass, preferably 20 to 100 parts by mass, with respect to 100 parts by mass of the copolymer (A).

By the copolymer composition (2) containing the hydrophilic fumed silica in the above range, there can be obtained the laminate excellent in the adhesive strength between a layer of the copolymer composition (2) and a layer of the saponified ethylene/vinyl acetate copolymer (B).

Here, as silica for the reinforcing agent, in addition to the above hydrophilic fumed silica, hydrophobic fumed silica is produced and sold, but even if the hydrophobic fumed silica is included in place of the hydrophilic fumed silica, the adhesive strength with the layer of the saponified ethylene/vinyl acetate copolymer (B) is not improved.

The copolymer composition (2) according to the present invention, in addition to the above hydrophilic fumed silica, may contain other components according to desired purposes, in such a range not to impair advantageous effects of the present invention. As the other components, there may be contained, for example, at least one selected from fillers other than the above hydrophilic fumed silica (referred to as other fillers), crosslinking aids, vulcanization accelerators, vulcanization aids, softeners, antioxidants, processing aids, activators, heat-resistant stabilizers, weathering stabilizers, antistatic agents, colorants, lubricants, thickeners, foaming agents and foaming aids. Each of these additives may be used singly in one kind or concurrently in two or more.

Here, the additives contained in the copolymer composition (2) according to the present invention are the same as the compounds contained in the above copolymer composition (1).

<Other Fillers>

Fillers other than the hydrophilic fumed silica which are contained in the copolymer composition (2) of the present invention are known rubber reinforcing agents contained in rubber compositions, and are usually carbon black and inorganic substances referred to as inorganic reinforcing agents.

When the copolymer composition (2) according to the present invention contains such a filler, the filler may be contained usually in the range of 100 to 300 parts by mass, preferably 100 to 250 parts by mass, with respect to 100 parts by mass of the above copolymer (A).

When the vulcanization accelerator is used, the content of the vulcanization accelerator in the copolymer composition (2) is, with respect to 100 parts by mass of the copolymer (A), usually 0.1 to 20 parts by mass, preferably 0.2 to 15 parts by mass and more preferably 0.5 to 10 parts by mass. In the above range of the content of the vulcanization accelerator, no blooming occurs on the surface of shaped products to be obtained and the copolymer composition exhibits excellent crosslinking properties. When a sulfur-based compound is used as the crosslinking agent, the vulcanization aid can be used concurrently.

Then, when the vulcanization aid is used, the content of the vulcanization aid in the copolymer composition (2) is usually 1 to 20 parts by mass with respect to 100 parts by mass of the copolymer (A).

When the copolymer composition (2) contains the softener, the content of the softener is, with respect to 100 parts by mass of the copolymer (A), usually 2 to 100 parts by mass and preferably 10 to 100 parts by mass.

When the copolymer composition (2) contains the antioxidant, the content of the antioxidant is, with respect to 100 parts by mass of the copolymer (A), usually 0.3 to 10 parts by mass and preferably 0.5 to 7.0 parts by mass. In the above range of the content of the antioxidant, no blooming occurs on the surface of shaped products to be obtained, and occurrence of the vulcanization inhibition can also be suppressed.

When the copolymer composition (2) contains the processing aid, the processing aid can suitably be contained usually in an amount of 1 to 3 parts by mass with respect to 100 parts by mass of the copolymer (A). The above range of the content of the processing aid is suitable because of being excellent in processability including kneadability, extrudability and injection moldability.

The above processing aid may be used singly in one kind thereof or in two or more kinds thereof.

When the copolymer composition (2) contains the activator, the content of the activator is, with respect to 100 parts by mass of the copolymer (A), usually 0.2 to 10 parts by mass and preferably 0.3 to 5 parts by mass.

<Copolymer Composition (3)>

The ethylene/α-olefin/non-conjugated polyene copolymer composition (3) in the present invention is a copolymer composition comprising the ethylene/vinyl acetate copolymer (C) of 5 to 50 parts by mass, preferably 5 to 40 parts by mass, with respect to 100 parts by mass of the copolymer (A).

By the ethylene/α-olefin/non-conjugated polyene copolymer composition (3) in the present invention containing the ethylene/vinyl acetate copolymer (C) in the above range, there can be obtained the laminate excellent in the adhesive strength between a layer of the copolymer composition (3) and a layer of the saponified ethylene/vinyl acetate copolymer (B).

The copolymer composition (3) according to the present invention, in addition to the above ethylene/vinyl acetate copolymer (C), may contain other components according to desired purposes, in such a range not to impair advantageous effects of the present invention. As the other components, there may be contained, for example, at least one selected from fillers, crosslinking agents, crosslinking aids, vulcanization accelerators, vulcanization aids, softeners, antioxidants, processing aids, activators, heat-resistant stabilizers, weathering stabilizers, antistatic agents, colorants, lubricants, thickeners, foaming agents and foaming aids. Each of these additives may be used singly in one kind or concurrently used in two or more.

Here, the additives contained in the copolymer composition (3) according to the present invention are the same as the compounds contained in the above copolymer composition (1) or copolymer composition (2).

When the copolymer composition (3) of the present invention contains the filler, the filler may be contained usually in the range of 100 to 300 parts by mass, preferably 100 to 250 parts by mass, with respect to 100 parts by mass of the above copolymer (A).

When an organic peroxide is used as the crosslinking agent, the content thereof in the copolymer composition (3) is, with respect to 100 parts by mass of the copolymer (A), usually 0.1 to 20 parts by mass, preferably 0.2 to 15 parts by mass and more preferably 0.5 to 10 parts by mass. The above range of the content of the organic peroxide is suitable since no blooming occurs on the surface of shaped products to be obtained, and the copolymer composition (3) exhibits excellent crosslinking properties.

When the crosslinking aid is used, the content of the crosslinking aid in the copolymer composition (3) is, with respect to 1 mol of the organic peroxide, usually 0.5 to 10 mol, preferably 0.5 to 7 mol and more preferably 1 to 6 mol.

When a sulfur-based compound is used as the crosslinking agent, the content thereof in the copolymer composition (3) is, with respect to 100 parts by mass of the copolymer (A), usually 0.3 to 10 parts by mass, preferably 0.5 to 7.0 parts by mass and more preferably 0.7 to 5.0 parts by mass. In the above range of the content of the sulfur-based compound, no blooming occurs on the surface of shaped products to be obtained, and the copolymer composition (3) exhibits excellent crosslinking properties.

When the vulcanization accelerator is used, the content of the vulcanization accelerator in the copolymer composition (3) is, with respect to 100 parts by mass of the copolymer (A), usually 0.1 to 20 parts by mass, preferably 0.2 to 15 parts by mass and more preferably 0.5 to 10 parts by mass.

In the above range of the content of the vulcanization accelerator, no blooming occurs on the surface of shaped products to be obtained, and the copolymer composition exhibits excellent crosslinking properties. When a sulfur-based compound is used as the crosslinking agent, the vulcanization aid can be used concurrently.

When the vulcanization aid is used, the content of the vulcanization aid in the copolymer composition (3) is usually 1 to 20 parts by mass with respect to 100 parts by mass of the total of the ethylene/α-olefin/non-conjugated polyene copolymer (A) and other polymers (crosslinkable rubber and the like) that are contained therein as required and that need crosslinking.

When the copolymer composition (3) of the present invention contains the softener, the content of the softener is, with respect to 100 parts by mass of the copolymer (A), usually 2 to 100 parts by mass and preferably 10 to 100 parts by mass.

When the copolymer composition (3) of the present invention contains the antioxidant, the content of the antioxidant is, with respect to 100 parts by mass of the copolymer (A), usually 0.3 to 10 parts by mass and preferably 0.5 to 7.0 parts by mass. In the above range of the content of the antioxidant, no blooming occurs on the surface of shaped products to be obtained, and occurrence of the vulcanization inhibition can also be suppressed.

When the copolymer composition (3) of the present invention contains the processing aid, the processing aid can suitably be contained usually in an amount of 1 to 3 parts by mass with respect to 100 parts by mass of the copolymer (A). The above range of the content of the processing aid is suitable because of being excellent in processability including kneadability, extrudability and injection moldability.

The processing aid may be used singly in one kind thereof or in two or more kinds thereof.

When the copolymer composition (3) of the present invention contains the activator, the content of the activator is, with respect to 100 parts by mass of the copolymer (A), usually 0.2 to 10 parts by mass and preferably 0.3 to 5 parts by mass.

When the copolymer composition (3) of the present invention contains the foaming agent, the content of the foaming agent is suitably selected according to the performance required for shaped products to be produced from the copolymer composition, but the foaming agent is used, with respect to 100 parts by mass of the copolymer (A), usually in the proportion of 0.5 to 30 parts by mass and preferably 1 to 20 parts by mass.

When the copolymer composition (3) of the present invention contains the foaming aid, the foaming aid is used, with respect to 100 parts by mass of the foaming agent, usually in the proportion of 1 to 100 parts by mass and preferably 2 to 80 parts by mass.

<Production Method of the Copolymer Compositions>

A production method of the copolymer compositions according to the present invention involves kneading, at a temperature of 80 to 170° C. for 2 to 20 min, the ethylene/α-olefin/non-conjugated polyene copolymer rubber(A), and dicumyl peroxide with the metal oxide, or the hydrophilic fumed silica, or the ethylene/vinyl acetate copolymer (C), and as required, additionally the filler, the softener, the processing aid, the crosslinking aid and the like by use of, for example, an internal mixer (closed type mixer) such as a Banbury mixer, a kneader or Intermix. Then, additives such as the crosslinking agent, the softener, the crosslinking aid and the vulcanization accelerator, and as required, additionally the vulcanization accelerator and the crosslinking aid, are added to and blended in the obtained blend, and kneaded, by using a roll such as an open roll or a kneader at a roll temperature of 40 to 80° C. for 5 to 30 min, and thereafter sheeted, whereby the copolymer compositions can be prepared.

Then, when the kneading temperature by the internal mixer is low, the dicumyl peroxide may be kneaded together with the ethylene/α-olefin/non-conjugated polyene copolymer (A) and the like.

<Saponified Ethylene/Vinyl Acetate Copolymer (B)>

A saponified ethylene/vinyl acetate copolymer (B) for forming the laminate of the present invention is a copolymer of ethylene with a vinyl alcohol, which copolymer is also referred to as an ethylene/vinyl alcohol copolymer and is produced by saponifying an ethylene/vinyl acetate copolymer.

The saponified ethylene/vinyl acetate copolymer (B) according to the present invention has an ethylene content of, though not especially limited to, usually in the range of 20 to 50% by mol and preferably 24 to 35% by mol. The saponified ethylene/vinyl acetate copolymer (B) according to the present invention has an MFR (load: 2,160 g, measurement temperature: 190° C.) of, as long as having melt extrusion moldability, though not especially limited to, usually in the range of 0.5 to 6.4 g/10 min.

The saponified ethylene/vinyl acetate copolymer (B) according to the present invention is produced and sold, specifically, in trade name of Eval by Kuraray Co., Ltd., and in trade name of Soarnol by Nippon Synthetic Chemical Industry Co., Ltd.

«Laminate»

The laminate of the present invention is a laminate formed by laminating a layer composed of the above copolymer composition with a layer composed of the above saponified ethylene/vinyl acetate copolymer (B).

The thickness of the layer of the copolymer composition of the laminate of the present invention can suitably be determined according to applications of the laminate, but is usually in the range of 0.03 to 30 mm, preferably 0.05 to 10 mm and more preferably 0.05 to 5 mm.

The thickness of the layer of the saponified ethylene/vinyl acetate copolymer (B) of the laminate of the present invention can suitably be determined according to applications of the laminate, but is usually in the range of 0.03 to 30 mm, preferably 0.05 to 30 mm and more preferably 0.05 to 5 mm.

The laminate of the present invention may have, in addition to the layer composed of the copolymer composition and the layer composed of the saponified ethylene/vinyl acetate copolymer (B), layers composed of various known materials according to applications of the laminate.

Examples of the layers to be laminated on the layer composed of the copolymer composition or the layer composed of the saponified ethylene/vinyl acetate copolymer (B) include a layer composed of NBR, ECO or the like, which is excellent in oil resistance.

The laminate of the present invention can be formed by various known shaping methods: specifically, for example, by coextruding the copolymer composition and the saponified ethylene/vinyl acetate copolymer (B) to give a laminate; by extruding or pressing the copolymer composition and the saponified ethylene/vinyl acetate copolymer (B) separately and then laminating a resultant layer of the copolymer composition and a resultant layer of the saponified ethylene/vinyl acetate copolymer (B); and various shaping methods including injection molding, calendering and blow molding.

By crosslinking the obtained laminate, the layer of the crosslinked copolymer composition and the layer of the saponified ethylene/vinyl acetate copolymer (B) are firmly joined.

As a method for crosslinking the laminate of the present invention, various known methods can be adopted. The crosslinked copolymer composition and the saponified ethylene/vinyl acetate copolymer (B) can be formed into a laminate having an intended shape, for example, by various shaping methods using an extruder, a calendar roll, a press, an injection molding machine, a transfer molding machine or the like, and crosslinked simultaneously with the shaping, or after the resultant laminate is introduced in a crosslinking tank. A crosslinked laminate can be obtained by heating at a temperature of 130 to 250° C. for 5 to 60 minutes or by irradiation with light, γ ray or electron beam. The crosslinking stage may be carried out with a mold or without a mold. When a mold is not used, steps of shaping and crosslinking are usually carried out continuously. As a method of heating in the crosslinking tank, a heating tank can be used which uses hot air, glass bead fluidized bed, UHF (ultrahigh frequency electromagnetic waves) or steam.

The laminate of the present invention is suitably used, for example, for production of hoses for automobiles, hoses for water supply and hoses for gases. The hoses for automobiles include brake hoses, radiator hoses, heater hoses and air cleaner hoses.

EXAMPLES

Hereinafter, the present invention will be described in more detail by way of Examples and Comparative Examples, but the present invention is not limited to these Examples.

Physical properties of copolymers used in Examples and Comparative Examples were measured by the following methods.

(Measurement and Evaluation Methods)

(Compositions and B-Values of Ethylene/α-Olefin/Non-Conjugated Polyene Copolymers)

The mass fraction (% by mass) and the B-value of each constituting unit of the ethylene/α-olefin/non-conjugated polyene copolymer were determined from measurement values by $^{13}$C-NMR. The measurement values were acquired by measurement of a spectrum by $^{13}$C-NMR of the copolymer, the measurement using an ECX400P-type nuclear magnetic resonance instrument (manufactured by JEOL Ltd.) under the condition of a measurement temperature of 120° C., a measurement solvent of orthodichlorobenzene/deuterated benzene (4/1), and the number of scans of 8,000.

(Intrinsic Viscosity [η])

The intrinsic viscosity [η] (dl/g) of the ethylene/α-olefin/non-conjugated polyene copolymer was measured by using a fully automatic intrinsic viscometer, manufactured by Rigo Co., Ltd. at a temperature of 135° C. and in a measurement solvent of decalin.

(Weight-Average Molecular Weight (Mw), Number-Average Molecular Weight (Mn), Molecular Weight Distribution (Mw/Mn))

The weight-average molecular weight (Mw), the number-average molecular weight (Mn) and the molecular weight distribution (Mw/Mn) of the ethylene/α-olefin/non-conjugated polyene copolymer were numerical values in terms of polystyrene measured by gel permeation chromatography (GPC). The measuring instrument and condition were as follows. The molecular weight was calculated by making a calibration curve by using commercially available monodispersed polystyrenes and based on the conversion method.

Instrument: Gel Permeation Chromatograph Alliance GP2000 type (manufactured by Waters Corp.)

Analyzing device: Empower2 (manufactured by Waters Corp.)

Columns: TSKgel GMH6-HT×2+TSKgel GMH6-HTL×2 (7.5 mm I.D.×30 cm, manufactured by Tosoh Corp.)

Column Temperature: 140° C.

Mobile phase: o-dichlorobenzene (containing 0.025% BHT)

Detector: a differential refractometer (RI), flow rate: 1.0 mL/minute

Injection volume: 400 μL

Sampling time interval: 1 s

Column calibration: monodispersed polystyrenes (manufactured by Tosoh Corp.)

Molecular weight conversion: EPR conversion by the old method/calibration method in consideration of the viscosity (1) Production of an ethylene/α-olefin/non-conjugated polyene copolymer Production Example 1

By using a 300 L-volume polymerization reactor equipped with a stirring blade, a polymerization reaction of ethylene, propylene and 5-vinyl-2-norbornene (VNB) was continuously carried out at 87° C.

As a polymerization solvent, hexane (feed volume: 32.6 L/h) was used; and ethylene in a feed amount of 3.6 kg/h, propylene in a feed amount of 6.1 kg/h and VNB in a feed amount of 290 g/h and hydrogen in a feed volume of 6.3 NL/h were continuously fed to the polymerization reactor.

While the polymerization pressure was held at 1.6 MPa and the polymerization temperature was held at 87° C., di(p-tolyl)methylene(cyclopentadienyl) (octamethyloctahydrodibenzof luorenyl)zirconium dichloride was used as a main catalyst and continuously fed in a feed amount of 0.0015 mmol/h to the polymerization reactor. Further, $(C_6H_5)_3CB(C_6F_5)_4$ (CB-3) as a co-catalyst in a feed amount of 0.0075 mmol/h and triisobutylaluminum (TIBA) as an organoaluminum compound in a feed amount of 20 mmol/h were continuously fed to the polymerization reactor.

A solution was thus obtained which contained 15.2% by mass of an ethylene/propylene/VNB copolymer formed from ethylene, propylene and VNB. A small amount of methanol was added to a polymerization reaction solution extracted from the polymerization reactor lower part to terminate the polymerization reaction; and the ethylene/propylene/VNB copolymer was separated from the solvent by steam stripping treatment, and dried under reduced pressure at 80° C. for a whole day and night.

By the above operation, the ethylene/propylene/VNB copolymer (A-1) formed from ethylene, propylene and VNB was obtained at a rate of 4.7 kg/h.

Physical properties of the obtained copolymer (A-1) were measured by the methods described above. Results are shown in Table 1.

TABLE 1

| Copolymer | A-1 |
|---|---|
| Ethylene/propylene [molar ratio] | 68/32 |
| VNB-IV[g/100 g] | 3.3 |
| VNB content [% by weight] | 1.6 |
| Mw | 178000 |

TABLE 1-continued

| Copolymer | A-1 | |
|---|---|---|
| Mw × VNB content/100/VNB molecular weight | 22.5 | 4.5 or higher and 40 or lower |
| [η][dl/g] | 2.3 | |

Here, in Example 3 and Comparative Example 3, the following ethylene/propylene/ENB copolymer [copolymer (A-2)] was used in place of the above copolymer (A-1).

(Ethylene/Propylene/ENB Copolymer)

A Mitsui EPT 2060M: an ethylene/propylene/ENB copolymer, ML (1+4) 125° C. (ASTM D1646): 40, ethylene/propylene [molar ratio]: 66/34, ENB content [% by weight]: 2.3, and intrinsic viscosity [η] [dl/g]: 2.2

(Layer of a Saponified Ethylene/Vinyl Acetate Copolymer)

As a layer of a saponified ethylene/vinyl acetate copolymer, there was used a film (EVOH film) of 100 μm in thickness of a saponified ethylene/vinyl acetate copolymer having an ethylene content of 32% by mol and an MFR of 1.6 g/10 min, Eval (trademark) F101B [manufactured by Kuraray Co., Ltd.].

The EVOH film was, before being laminated with a layer of a copolymer composition, dried at 100° C. for 3 hours under reduced pressure, and was stored in a package container.

Example 1

(Preparation of a Copolymer Composition)

As a first stage, the copolymer (A-1) obtained in Production Example 1 was masticated for 30 seconds by using a BB-2 type Banbury mixer (manufactured by KOBE Steel, Ltd.), and then to 100 parts by mass of the copolymer (A-1) were added 80 parts by mass of an FEF carbon black (Asahi #60UG, manufactured by Asahi Carbon Co., Ltd.), 5 parts by mass of a zinc white (manufactured by Hakusui Tech Co., Ltd.), 1 part by mass of stearic acid, and 50 parts by mass of Diana Process Oil PS-430 (manufactured by Idemitsu Kosan Co., Ltd.), and kneaded at 140° C. for 2 minutes. Thereafter, the ram of the mixer was lifted and cleaning was carried out, and the resultant was further kneaded for 1 minute and then discharged at about 150° C. to obtain a first-stage compound.

Then, as a second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm);

and there was added thereto, 6.8 parts by mass of a masterbatch (trade name: DCP-40c, manufactured by Kayaku Akzo Co., Ltd.) containing 40% by mass of dicumyl peroxide as an organic peroxide component (2.72 parts by mass in terms of organic peroxide), and kneaded for 10 minutes to thereby obtain an uncrosslinked copolymer composition (compound).

(Fabrication and Evaluation of a Laminate)

(Fabrication of a Laminate for a T-Form Peel Test)

The copolymer composition obtained in the above preparation of a copolymer composition was sheeted in a sheet form. Then, upper and lower sides of the sheeted copolymer composition sheet of 50 g were interposed between stretched polyethylene terephthalate films (manufactured by Toray Industries, Inc., Lumirror). The copolymer composition sheet whose upper and lower sides had been interposed between the Lumirror films was pressed at 120° C. for 2 minutes by using a 50-ton press, to give a copolymer composition sheet of 1 mm in t (thickness) and 20 cm square.

Then, the copolymer composition sheet (layer 1) having been pressed was cut into a size for main pressing (15 cm×15 cm×t=1 mm). After the cutting, the upper and lower Lumirror films were separated off.

Then, the EVOH film (layer 2) having been dried at 110° C. for 3 hours under vacuum was cut into the size for main pressing (15 cm×15 cm×t=1 mm). Then, the sheet (layer 1) and the film (layer 2) were superposed. In the superposing, the sheet and the film were superposed in the state that a Lumirror film was tucked in a part (3 cm in width, 15 cm in length: grip margin in the peel test) of the copolymer composition sheet, and the sheet and film with the Lumirror film tucked in the part was pressed (main pressing) at 180° C. for 10 minutes by using a 100-ton press to crosslink the copolymer composition sheet, to thereby give a laminate of 2 mm in thickness.

The Lumirror film was removed from the obtained laminate; then, the copolymer composition sheet and the EVOH film were interlaminarly peeled by hand; and the peelability (adhesiveness) was evaluated in 5 ranks of 1 to 5 by determining the case where no adhesion was observed, as 1 in the ranks and the state that they were unable to be peeled by hand due to firm adhesion, as 5 therein.

Evaluation results are shown in Table 2.

Example 2

A copolymer composition and a laminate were obtained as in Example 1, except for altering 5 parts by mass of zinc white (manufactured by Hakusui Tech Co., Ltd.) to 5 parts by mass of magnesium oxide (Kyowamag 150 (manufactured by Kyowa Chemical Industry Co., Ltd.) in the copolymer composition used in Example 1.

Evaluation results of the obtained laminate are shown in Table 2.

Example 3

A copolymer composition and a laminate were obtained as in Example 1, except for using the copolymer (A-2) in place of the copolymer (A-1) used in Example 1. Evaluation results of the obtained laminate are shown in Table 2.

Comparative Example 1

A copolymer composition and a laminate were obtained as in Example 2, except for using, as crosslinking agents, 3 parts by mass of 2,5-dimethyl-2,5-(t-butylperoxy)hexane, Perhexa 25B40 (manufactured by NOF Corp.) and 3 parts by mass of trimethylolpropane trimethacrylate, Hi-Cross M (manufactured by Seiko Chemical Co., Ltd.), in place of the masterbatch, containing 40% by mass of dicumyl peroxide, used in Example 2.

Evaluation results of the obtained laminate are shown in Table 2.

Comparative Example 2

A copolymer composition and a laminate were obtained as in Example 1, except for using a copolymer composition without the zinc white, in place of the copolymer composition used in Example 1.

Evaluation results of the obtained laminate are shown in Table 2.

Comparative Example 3

A copolymer composition and a laminate were obtained as in Example 3, except for using, as a crosslinking agent and crosslinking aids, 1.5 parts by mass of powdery sulfur and 1 part by mass of tetramethylthiuram disulfide, trade name: Nocceler TT-P(TT) (manufactured by Ouchi Shinko Chemical Industry Ltd.) and 0.5 part by mass of 2-mercaptobenzothiazole, trade name: Nocceler M-P(M) (manufactured by Ouchi Shinko Chemical Industry Ltd.), in place of the masterbatch, containing 40% by mass of dicumyl peroxide, used in Example 3.

Evaluation results of the obtained laminate are shown in Table 2.

TABLE 2

| Layer of Copolymer Composition | | | Example 1 | Example 2 | Example 3 | Comparative Example 1 | Comparative Example 2 | Comparative Example 3 |
|---|---|---|---|---|---|---|---|---|
| First Stage | Copolymer (A-1) | Parts by mass | 100 | 100 | — | 100 | 100 | — |
| | Copolymer (A-2) | Parts by mass | — | — | 100 | — | — | 100 |
| | ZnO | Parts by mass | 5 | — | 5 | — | — | 5 |
| | MgO | Parts by mass | — | 5 | — | 5 | — | — |
| | Stearic acid | Parts by mass | 1 | 1 | 1 | 1 | 1 | 1 |
| | FEF carbon (Asahi 60UG) | Parts by mass | 80 | 80 | 80 | 80 | 80 | 80 |
| | PS-430 | Parts by mass | 50 | 50 | 50 | 50 | 50 | 50 |
| Second Stage | Perhexa 25B40 | Parts by mass | — | — | — | 3 | — | — |
| | DCP-40C | Parts by mass | 6.8 | 6.8 | 6.8 | — | 6.8 | — |
| | Hi-Cross M | Parts by mass | — | — | — | 3 | — | — |
| | M | Parts by mass | — | — | — | — | — | 0.5 |
| | TT | Parts by mass | — | — | — | — | — | 1 |
| | Sulfur | Parts by mass | — | — | — | — | — | 1.5 |
| Total Amount | | Parts by mass | 242.8 | 242.8 | 242.8 | 242 | 237.8 | 239 |
| Adhesiveness with EVOH Layer | | | 4 | 4 | 4 | 1 | 1 | 2 |

Example 4

(Preparation of a Copolymer Composition)

As a first stage, the above copolymer (A-1) was masticated for 30 seconds by using a BB-2 type Banbury mixer (manufactured by KOBE Steel, Ltd.), and to 100 parts by mass of the copolymer (A-1) were added 3 parts by mass of an active zinc white (Meta-Z 102, manufactured by Inoue Calcium Corp.), 1 part by mass of polyethylene glycol (PEG 4000, manufactured by NOF Corp.), 6 parts by mass of calcium oxide (Vesta 18, manufactured by Inoue Calcium Corp.), 3 parts by mass of pentaerythritol tristearate/paraffin wax mixture (Emaster 430W, manufactured by Riken Vitamin Co., Ltd.), 5 parts by mass of an FEF carbon black (Asahi #60UG, manufactured by Asahi Carbon Co., Ltd.), 86 parts by mass of a hydrophilic fumed silica (AEROSIL 200, manufactured by Nippon Aerosil Co., Ltd.), a heavy calcium carbonate (Whiton SB Red, manufactured by Shiraishi Calcium Kaisha, Ltd.), and 1 part by mass of stearic acid, and kneaded at 140° C. for 2 minutes. Thereafter, the ram of the mixer was lifted and cleaning was carried out, and the resultant was further kneaded for 1 minute and then discharged at about 150° C. to obtain a first-stage compound.

Then, as a second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm); and there was added thereto, 6.8 parts by mass of a masterbatch (trade name: DCP-40c, manufactured by Kayaku Akzo Co., Ltd.) containing 40% by mass of dicumyl peroxide as an organic peroxide component (2.72 parts by mass in terms of organic peroxide), 2 parts by mass of 2-mercaptobenzimidazole (trade name: Nocrac MB, manufactured by Ouchi Shinko Chemical Industrial Co., Ltd.), 1 part by mass of pentaervthritol-tetrakis[3-(3',5'-di-tert-butyl-4'-hydroxyphenyl)propionate](trade name: Irganox 1010, manufactured by BASF AG), and 51 parts by mass of a paraffinic oil (trade name: PW-380, manufactured by Idemitsu Kosan Co., Ltd.), and kneaded for 10 minutes to thereby obtain an uncrosslinked copolymer composition (copolymer compound).

(Fabrication and Evaluation of a Laminate)

(Fabrication of a Laminate for a T-Form Peel Test)

The copolymer composition obtained in the above preparation of a copolymer composition was sheeted in a sheet form. Then, upper and lower sides of the sheeted copolymer composition sheet of 50 g were interposed between stretched polyethylene terephthalate films (manufactured by Toray Industries, Inc., Lumirror). The copolymer composition sheet whose upper and lower sides had been interposed between the Lumirror films was pressed at 120° C. for 2 minutes by using a 50-ton press, to give a copolymer composition sheet of 1 mm in t (thickness) and 20 cm square.

Then, the copolymer composition sheet (layer 1) having been pressed was cut into a size for main pressing (15 cm×15 cm×t=1 mm). After the cutting, the upper and lower Lumirror films were separated off.

Then, the EVOH film (layer 2) having been dried at 110° C. for 3 hours under vacuum was cut into the size for main pressing (15 cm×15 cm×t=1 mm). Then, the sheet (layer 1) and the film (layer 2) were superposed. In the superposing, the sheet and the film were superposed in the state that a Lumirror film was tucked in a part (3 cm in width, 15 cm in length: grip margin in the peel test) of the copolymer composition sheet, and the superposed sheet and film with the Lumirror film tucked in the part was pressed (main pressing) at 180° C. for 10 minutes by using a 100-ton press to crosslink the copolymer composition sheet, to thereby give a laminate of 2 mm in thickness.

The Lumirror film was removed from the obtained laminate; then, the copolymer composition sheet and the EVOH film were interlaminarly peeled by hand; and the peelability (adhesiveness) was evaluated in 5 ranks of 1 to 5 by determining the case where no adhesion was observed, as 1 in the ranks and the state that they were unable to be peeled by hand due to firm adhesion, as 5 therein.

Evaluation results are shown in Table 3

Comparative Example 4 and Comparative Example 5

Laminates were obtained as in Example 4, except for using copolymer compositions containing compounding ingredients indicated in Table 3 in contents indicated in Table 3, in place of the copolymer composition used in Example 4.

Here, SFR carbon (Asahi 50G) indicated in Table 3 was an SFR carbon black (Asahi #50G, manufactured by Asahi Carbon Co., Ltd.), and AEROSIL RX200 was a hydrophobic fumed silica (AEROSIL RX200, manufactured by Nippon Aerosil Co., Ltd.).

Evaluation results are shown in Table 3.

TABLE 3

| | Layer of Copolymer Composition | | Example 4 | Comparative Example 4 | Comparative Example 5 |
|---|---|---|---|---|---|
| First Stage | Copolymer (A-1) | Parts by mass | 100 | 100 | 100 |
| | Meta-Z 102 | Parts by mass | 3 | 3 | 3 |
| | Stearic acid | Parts by mass | 1 | 1 | 1 |
| | PEG4000 | Parts by mass | 1 | 1 | 1 |
| | Vesta 18 | Parts by mass | 6 | 6 | 6 |
| | Emaster 430W | Parts by mass | 3 | 3 | 3 |
| | FEF carbon (Asahi 60UG) | Parts by mass | 5 | 36 | 5 |
| | SRF carbon (Asahi 50G) | Parts by mass | — | 55 | — |
| | AEROSIL 200 | Parts by mass | 86 | — | — |
| | AEROSIL RX200 | Parts by mass | — | — | 86 |
| | Whiton SB | Parts by mass | 90 | 90 | 90 |
| Second Stage | Nocrac MB | Parts by mass | 2 | 2 | 2 |
| | Irganox1010 | Parts by mass | 1 | 1 | 1 |
| | PW-380 | Parts by mass | 51 | 51 | 51 |
| | DCP-40C | Parts by mass | 6.8 | 6.8 | 6.8 |
| | Total [phr] | Parts by mass | 355.8 | 355.8 | 355.8 |
| | Evaluation of Adhesiveness with Layer of Saponified Substance | | 5 | 3 | 2 |

(2) An Ethylene/Vinyl Acetate Copolymer (C)

As an ethylene/vinyl acetate copolymer (C), there was used trade name: Evaflex, brand: EVA150 (MFR: 30 g/10 min, VA content: 33% by weight, density: 960 kg/m$^3$, manufactured by Du Pont-Mitsui Polychemicals Co., Ltd.) (EVA150).

Example 5

(Preparation of a Copolymer Composition)

As a first stage, the above copolymer (A-1) was masticated for 30 seconds by using a BB-2 type Banbury mixer (manufactured by KOBE Steel, Ltd.), and then to 100 parts by mass of the copolymer (A-1) were added 10 parts by mass of the above EVA-150, 3 parts by mass of zinc oxide (Meta-Z 102, manufactured by Inoue Calcium Corp.), 1 part by mass of polyethylene glycol (PEG 4000, manufactured by NOF Corp.), 6 parts by mass of calcium oxide (Vesta 18, manufactured by Inoue Calcium Corp.), 3 parts by mass of pentaerythritol tristearate/paraffin wax mixture (Emaster 430W, manufactured by Riken Vitamin Co., Ltd.), 5 parts by mass of FEF carbon black (Asahi #60UG, manufactured by Asahi Carbon Co., Ltd.), 86 parts by mass of hexamethyldisilazane-treated silica (AEROSIL RX200, manufactured by Evonic Degussa GmbH), heavy calcium carbonate (Whiton SB Red, manufactured by Shiraishi Calcium Kaisha, Ltd.), and 1 part by mass of stearic acid, and kneaded at 140° C. for 2 minutes. Thereafter, the ram of the mixer was lifted and cleaning was carried out, and kneading was further carried out for 1 minute on the resultant, which was then discharged at about 150° C. to thereby obtain a first-stage compound.

Then, as a second stage, the compound obtained in the first stage was wound on an 8-inch roll (manufactured by Nippon Roll Mfg. Co., Ltd., front roll surface temperature: 50° C., rear roll surface temperature: 50° C., front roll rotating speed: 16 rpm, rear roll rotating speed: 18 rpm); and there were added thereto, 2 parts by mass of 2-mercaptobenzimidazole (Nocrac MB, manufactured by Ouchi Shinko Chemical Industrial Co., Ltd.), 1 part by mass of pentaerythritol-tetrakis(3-(3',5'-di-tert-butyl-4'-hydroxyphenyl)propionate)(Irganox 1010, manufactured by BASF AG), 51 parts by mass of Diana Process Oil PW-380 (manufactured by Idemitsu Kosan Co., Ltd.), and 6.8 parts by mass of a masterbatch (trade name: DCP-40c, manufactured by Kayaku Akzo Co., Ltd.) containing 40% by mass of dicumyl peroxide as an organic peroxide component (2.72 parts by mass in terms of organic peroxide), and kneaded for 10 minutes to thereby obtain an uncrosslinked copolymer composition (copolymer compound).

(Fabrication and Evaluation of a Laminate)

(Fabrication of a Laminate for a T-Form Peel Test)

The copolymer composition obtained in the above preparation of a copolymer composition was sheeted in a sheet form. Then, upper and lower sides of the sheeted copolymer composition sheet of 50 g were interposed between stretched polyethylene terephthalate films (manufactured by Toray Industries, Inc., Lumirror). The copolymer composition sheet whose upper and lower sides had been interposed between the Lumirror films was pressed at 120° C. for 2 minutes by using a 50-ton press, to give a copolymer composition sheet of 1 mm in t (thickness) and 20 cm square.

Then, the copolymer composition sheet (layer 1) having been pressed was cut into a size for main pressing (15 cm×15 cm×t=1 mm). After the cutting, the upper and lower Lumirror films were separated off.

Then, the EVOH film (layer 2) having been dried at 110° C. for 3 hours under vacuum was cut into the size for main pressing (15 cm×15 cm×t=1 mm). Then, the sheet (layer 1) and the film (layer 2) were superposed. In the superposing, the sheet and the film were superposed in the state that a Lumirror film (t=0.2 mm) was tucked in a part (3 cm in width, 15 cm in length: grip margin in the peel test) of the copolymer composition sheet, and the superposed sheet and film with the Lumirror film tucked in the part was pressed (regular press) at 180° C. for 10 minutes by using a 100-ton press to crosslink the copolymer composition sheet, to thereby give a laminate of 2 mm in thickness.

The Lumirror film was removed from the obtained laminate; then, the copolymer composition sheet and the EVOH film were interlaminarly peeled by hand; and the peelability (adhesiveness) was evaluated in 5 ranks of 1 to 5 by determining the case where no adhesion was observed, as 1 in the ranks and the state that they were unable to be peeled by hand due to firm adhesion, as 5 therein.

Evaluation results are shown in Table 4.

Example 6

A laminate was obtained as in Example 5, except for using a hydrophilic fumed silica (AEROSIL 200, manufactured by Evonic Degussa GmbH) in place of AEROSIL RX200 used in Example 5. Evaluation results are shown in Table 4.

Comparative Example 6

A laminate was obtained as in Example 5, except for using a copolymer composition without either AEROSIL RX200 or EVA 150, in place of the copolymer composition used in Example 5. Evaluation results are shown in Table 4.

Comparative Example 7

A laminate was obtained as in Example 5, except for using a copolymer composition without EVA 150, in place of the copolymer composition used in Example 5. Evaluation results are shown in Table 4.

TABLE 4

| | Copolymer Composition | | Example 5 | Example 6 | Comparative Example 6 | Comparative Example 7 |
|---|---|---|---|---|---|---|
| First Stage | Copolymer (A-1) | Parts by mass | 100 | 100 | 100 | 100 |
| | EVA150 | Parts by mass | 10 | 10 | — | — |
| | Meta-Z 102 | Parts by mass | 3 | 3 | 3 | 3 |
| | Stearic acid | Parts by mass | 1 | 1 | 1 | 1 |
| | PEG4000 | Parts by mass | 1 | 1 | 1 | 1 |
| | Vesta 18 | Parts by mass | 6 | 6 | 6 | 6 |
| | Emaster 430W | Parts by mass | 3 | 3 | 3 | 3 |

TABLE 4-continued

| | Copolymer Composition | | Example 5 | Example 6 | Comparative Example 6 | Comparative Example 7 |
|---|---|---|---|---|---|---|
| | FEF carbon (Asahi 60UG) | Parts by mass | 5 | 5 | 36 | 5 |
| | SRF carbon (Asahi 50G) | Parts by mass | — | — | 55 | — |
| | AEROSIL 200 | Parts by mass | — | 86 | — | — |
| | AEROSIL RX200 | Parts by mass | 86 | — | — | 86 |
| | Whiton SB | Parts by mass | 90 | 90 | 90 | 90 |
| Second | Nocrac MB | Parts by mass | 2 | 2 | 2 | 2 |
| Stage | Irganox1010 | Parts by mass | 1 | 1 | 1 | 1 |
| | PW-380 | Parts by mass | 51 | 51 | 51 | 51 |
| | DCP-40C | Parts by mass | 6.8 | 6.8 | 6.8 | 6.8 |
| Total Amount | | Parts by mass | 365.8 | 365.8 | 355.8 | 355.8 |
| <Evaluation of Adhesiveness> | | | | | | |
| Adhesiveness with EVOH Layer | | | 5 | 5 | 3 | 2 |

The invention claimed is:

1. A laminate comprising: a layer of a copolymer composition comprising 100 parts by mass of an ethylene/α-olefin/non-conjugated polyene copolymer (A) and one or more additives selected from the following (1) to (3); and a layer of a saponified ethylene/vinyl acetate copolymer (B);
   (1) 1.7 to 20 parts by mass of dicumyl peroxide and 2 to 20 parts by mass of a metal oxide
   (2) 20 to 120 parts by mass of a hydrophilic fumed silica
   (3) 5 to 50 parts by mass of an ethylene/vinyl acetate copolymer (C).

2. The laminate according to claim 1, comprising: a layer comprising 100 parts by mass of the ethylene/α-olefin/non-conjugated polyene copolymer (A) and 5 to 50 parts by mass of the ethylene/vinyl acetate copolymer (C); and a layer comprising the saponified ethylene/vinyl acetate copolymer (B).

3. The laminate according to claim 1, comprising: a layer of a copolymer composition (1) comprising 100 parts by mass of the ethylene/α-olefin/non-conjugated polyene copolymer (A), and 1.7 to 20 parts by mass of dicumyl peroxide and 2 to 20 parts by mass of the metal oxide; and a layer of the saponified ethylene/vinyl acetate copolymer (B).

4. The laminate according to claim 3, wherein the metal oxide is zinc oxide or magnesium oxide.

5. The laminate according to claim 1, comprising: a layer of a copolymer composition (2) comprising 100 parts by mass of the ethylene/α-olefin/non-conjugated polyene copolymer (A) and 20 to 120 parts by mass of the hydrophilic fumed silica; and a layer of the saponified ethylene/vinyl acetate copolymer (B).

6. The laminate according to claim 5, wherein the copolymer composition (2) forming the layer of the copolymer composition cited in claim 4 further comprises 1.7 to 20 parts by mass of dicumyl peroxide.

* * * * *